United States Patent [19]

Quinlisk

[11] 4,281,789
[45] Aug. 4, 1981

[54] CLIMATE CONTROL FOR AN ANIMAL BARN

[75] Inventor: Warren Quinlisk, La Crosse, Wis.

[73] Assignee: L. B. White Company, Inc., Onalaska, Wis.

[21] Appl. No.: 65,418

[22] Filed: Aug. 10, 1979

[51] Int. Cl.³ .......................... F24F 7/00; F24D 11/00
[52] U.S. Cl. ..................................... 236/44 C; 236/49; 237/46
[58] Field of Search ................. 236/49, 44 C; 237/46; 165/16

[56] References Cited

U.S. PATENT DOCUMENTS

| 2,261,852 | 11/1941 | Mathis | 236/44 C |
| 2,276,835 | 3/1942 | Gibson | 165/16 |
| 2,972,475 | 2/1961 | Monroe | 237/46 |

Primary Examiner—William E. Wayner
Assistant Examiner—Harry B. Tanner
Attorney, Agent, or Firm—Andrus, Sceales, Starke & Sawall

[57] ABSTRACT

A device for controlling the temperature and the humidity of the air in a barn has a thermostat, humidistat, heater and damper to maintain the desired proper temperature and humidity conditions for animal housing. The temperature is held at a desired level by the thermostat which monitors the temperature and heats and circulates the existing air in the barn as required. In addition, the humidistat initiates a process of heating outside air and supplying of heated dry air to the barn in response to abnormally high humidity conditions and thereby maintains the desired optimum temperature and humidity conditions.

2 Claims, 2 Drawing Figures

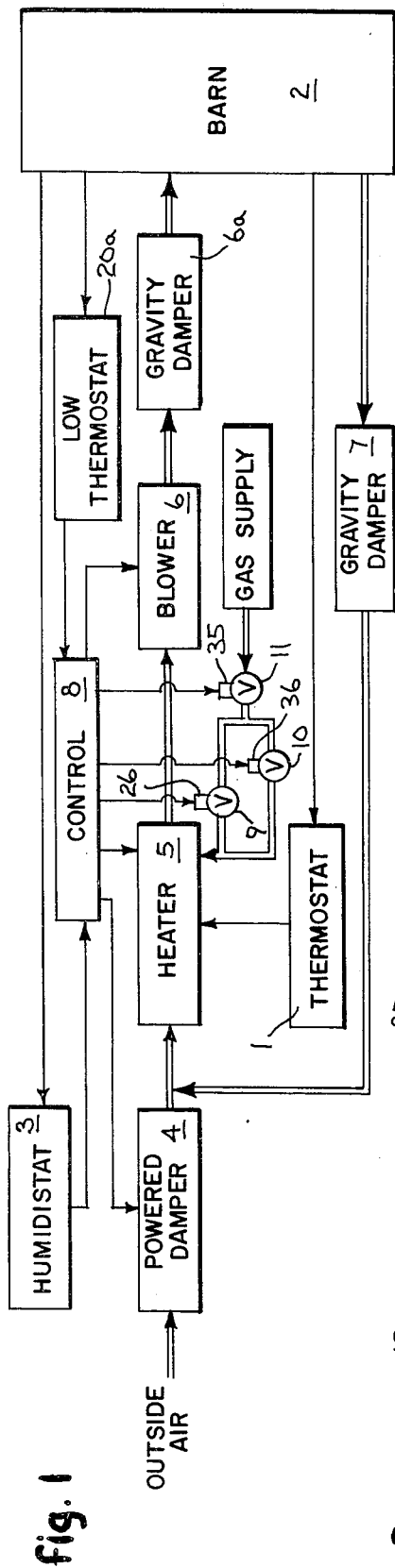
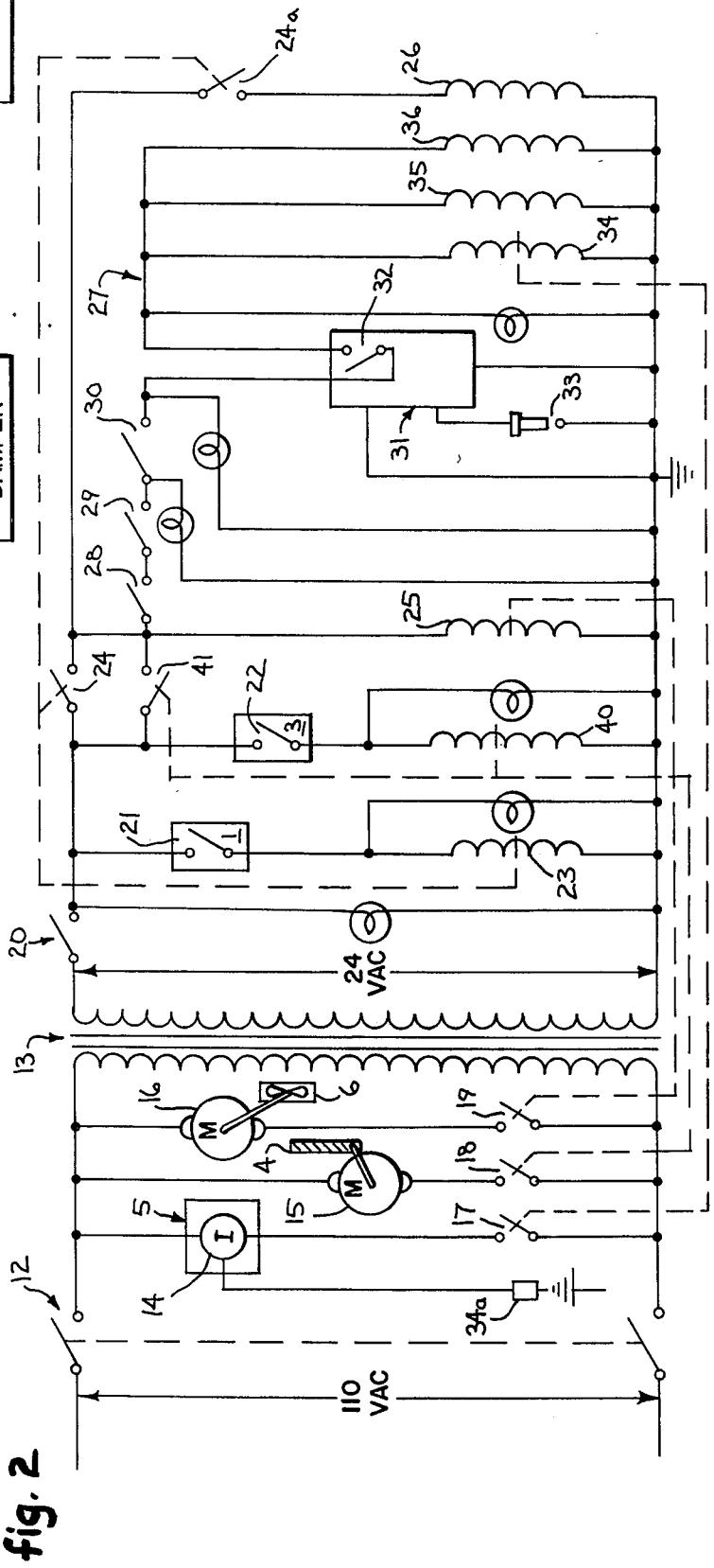
fig. 1
fig. 2

CLIMATE CONTROL FOR AN ANIMAL BARN

BACKGROUND AND SUMMARY OF THE INVENTION

This invention relates to climate control for a barn and more particularly to a device for controlling the temperature and humidity of the air in a barn.

In buildings that are used to house poultry and livestock, it is important to maintain a desirable building climate. A well controlled environment involves monitoring and regulating both the temperature and relative humidity.

Properly controlled temperatures enable animals to use feed for growth rather than for body heat. A properly heated barn results in lower feed costs and increased animal productivity.

Control over the level of humidity in the barn is necessary because excess humidity contributes to animal discomfort and promotes the growth of harmful air born bacteria that can cause respiration diseases. A damp barn also requires more frequent changes of bedding and litter which increases cleaning costs.

Heretofore, barn climate controls consisted of heaters and manually controlled ventilating fans. While the heaters may have automatically started operating in response to low barn temperatures, the ventilating fans usually required manual control and once in operation did little more than exhaust damp air from the barn.

It is the aim of the present invention to provide a device which monitors the temperature and humidity of the barn and which automatically heats and circulates the air upon detecting a low temperature condition in the barn, and which alternately or simultaneously automatically heats and introduces outside air into the barn upon detecting a high level of relative humidity in the barn.

In accordance with one aspect of the invention, the device is provided with a thermostat which senses the temperature of the air in the barn and compares it to a preselected temperature. Upon the detection of a temperature below the preselected level the thermostat initiates a process of heating and circulating the then existing air in the barn. A humidistat is also provided which simultaneously senses the relative humidity of the existing air in the barn and compares it to a preselected humidity level. Upon the detection of a humidity level which exceeds the preselected humidity level, the humidistat initiates an interrelated heating cycle and introduces outside air into the barn while exhausting the humid existing air.

The present invention thus provides a climate control which regulates both temperature and humidity resulting in increased animal comfort and productivity, lower feed costs, and a reduction in time and money spent on maintenance and cleaning.

DESCRIPTION OF THE DRAWING FIGURES

The accompanying drawings illustrate the best mode presently contemplated by the inventor for carrying out the invention.

In the drawings:

FIG. 1 is a diagrammatical block illustration of a climate control of one embodiment of the present invention; and FIG. 2 is an electrical circuit schematic which operatively connects the elements of the present invention.

DESCRIPTION OF THE PREFERRED EMBODIMENT

As is shown in the block diagram of FIG. 1, a thermostat 1 monitors the temperature of the air in barn 2 while a humidistat 3 monitors the relative humidity. A power damper 4 is provided to supply outside air into a barn heater 5. A blower 6 is connected to the discharge side of a heater 5 and supplies the heated air into the barn 1. A gravity operated damper 6a is connected between the blower 6 and the outlet to the barn 1. Damper 6a minimizes migration of moisture into heater 5 when the system is in standby awaiting a demand heat or ventilation. A gravity operated damper 7 also connects the barn air to the heater for controlled recirculating and heating the barn air. The usual air exhaust means, not shown, are provided. A heater-blower control unit 8 operably connects the heater 5 and blower 6 to both thermostat 1 and humidistat 3 for selectively conditioning air supplied to the animal barn 1. In addition, humidistat 3 simultaneously controls the damper 4 to provide a conjoint control of the barn air.

In the illustrated embodiment, the heater 5 is a gas fired unit connected to a suitable gas supply through a solenoid-operated hi-fire valve 9 or a parallel solenoid-operated low-fire valve 10. A redundant solenoid-operated interlock valve 11 is connected in series between valve 9 and 10 and the gas supply to shut down the heater under certain conditions.

As is illustrated in FIG. 2, the device of the present invention is connected to a suitable power source such as the conventionally available 110 volts A.C. distribution system by means of an on-off switch 12. When closed, switch 12 allows 110 volts of alternating current to flow through the primary coil of a step-down transformer 13 and directly to certain A.C. power components. Thus, a furnace ignitor 14, damper motor 15 and blower motor 16 are connected in parallel with each other and with the primary of the transformer 13 and are powered by the 110 volt source when their respective relay switches 17, 18 and 19 are closed.

The secondary coil of step-down transformer 13 provides a low voltage supply such as 24 volts A.C. suitable for operation of the control unit 8 of the device. The secondary coil is connected in series with a low temperature thermostat switch 20. Switch 20 is normally in a closed position and provides power to the several control relays as hereinafter described. Generally the switch 20 opens to turn off the blower should the minimum thermostat sense a "no heat" building condition indicating only cold air is being supplied into the building.

The switch 20 forms part of a low temperature thermostat unit 20a which is mounted within the barn building 2 and is set in a selected minimum temperature. The thermostat switch 20 is normally closed and the control unit 8 is operative to maintain the temperature in the barn above such minimum level. If in fact the level falls below such minimum, it would indicate that the heating system is supplying cold air. This, of course, is worse than supplying no air. The minimum temperature thermostat then responds by opening switch 20 which is operative to disable heater 5 and in particular, the blower 6 to prevent further circulation of the air.

The illustrated control unit 8 includes individual branch circuits for selectively controlling each of the main operating components, particularly, the heater igniter 14, and the damper motor 15 and the blower motor 16. A first branch circuit for controlling of the blower 6 and the heater 5 includes a thermostat switch 21 forming a part of the thermostat 1. A second branch circuit for controlling heater 5, blower 6 and damper 4 includes a humidistat switch 22 of humidistat 3.

The thermostat switch 21 of the thermostat 1 is normally open and is closed whenever the temperature falls below the desired setpoint level to operate heater 5 and blower 6. The switch 21 is connected in series with a relay coil 23. Whenever the thermostat switch 21 closes, the relay coil 23 is energized and closes contacts 24 ad 24a for supplying of power to operate the heater 5 and blower 6. Thus, the relay coil 23 closes the first set of contacts 24 shown connected in series with the low limit thermostat switch 20 to supply power to a blower branch circuit and to first and second heater branch circuits. The blower branch circuit includes a blower relay winding or coil 25 which is coupled directly to operate the switch 19 for blower motor 16. The relay contacts 24 also supply power to the second set of supply relay contacts 24a which are connected in series to energize solenoid winding 26 of the gas solenoid operated valve 9. Solenoid 26 operates the hi-fire gas valve 9 for supplying a maximum gas flow to the heater and thus conditioning of the system for operation. The burner cannot operate, however, until the redundant interlock safety valve 11 is also operated which is controlled by an interlocking branch circuit 27 for controlling of the operation of the heater 5 and damper 4. Circuit 27 is connected to the transformer through switch 20 and the relay contacts 24. Circuit 27 includes a series of three interlock switches, including a maximum temperature thermostat switch 28, an air flow switch 29 and a hi-limit switch 30. Maximum temperature switch 28 is a normally closed switch forming a part of thermostat 1, which is set to open at all temperatures above a pre-selected temperature. Normally, the maximum switch will be set to respond to a temperature of 5° above the pre-selected desired or setpoint temperature. Switch 29 is a normally open switch and closes in response to a predetermined minimum air flow through the heater 5. If the air flow should decrease for any reason, such as a restriction through the system, abnormally low speed operation of the blower or the like, the switch 29 returns to its normally open position, thereby opening of the power to the branch circuit 27. Finally, switch 20 is a normally closed high limit switch which monitors the temperature inside of the heating device, particularly the outlet side, and opens in the event the temperature therein rises above the desired maximum reheater operating level. In a practical application, a thermostat for switch 30 may be set to open the switch if the temperature exceeds 275° F., indicating an abnormal heating operation.

The branch circuit thus receives power only if the various pre-determined safe operating conditions are present. The branch circuit 27 includes a first circiut branch including a flame monitoring interlock circuit shown as a known direct spark ignition control unit 31 such as a Model S825 direct spark ignitor which is commercially available from Honeywell, Inc. of Minneapolis, Minn. The control is basically a relay circuit interlock having a set of normally open contacts 32 connected in series with safety switches 28 through 30. The unit 31 is powered upon the closing of the safety switches 28–30 to close contacts 32 and power the branch circuit 27 to transmit sparks to the spark igniter 14 located on the burner and to further transmit power to the interlock valves, as hereinafter described. The direct spark ignition control unit 31 also monitors the creation and continued presence of a flame by a small series connected flame monitor unit 33 which coupled to sense the flame. If a flame condition is not sensed within the set period such as 11 seconds, the control opens and removes the power from the control branches of circuit 27.

Circuit 27 includes an igniter interlock timing relay winding 34 connected to operate switch 17 for operation of the igniter unit 14, which may include a transformer means coupled to fire an ignition electrode 34a. Winding 34 operates to hold the ignitor on for the short period of time sufficient to fire the heater 5 and then resets to open the contacts and remove power from the spark igniter. Connected in parallel with the winding 34 is a pair of solenoid gas solenoids 35 and 36 for controlling the respective gas valves 10 and 11. The valves 10 and 11 open simultaneously with the energizing of the time delay relay winding 34 to simultaneously establish the gas flow to the burner with the provision of spark to the igniter. The flame should therefore rapidly be developed.

Under normal sensed operations if temperature switch 21 of thermostat 1 closes or switch 17 of humidistat 3 closes, power is supplied to the heater 5 and blower 6 and the main fire control solenoid 22 operates to establish a high fire condition. If, however, any abnormal condition exists or a flame is not created, the interlock switch 32 is actuated to simultaneously open the circuit to the igniter relay winding 34 and solenoids 35 and 36 to close the gas valves 10 and 11.

The humidistat 3 is similarly connected in a parallel branch circuit with thermostat 1 between the switch 20 and the switch 24. The humidistat branch includes switch 22 responsible to the humidity setpoint condition and connected in series with an interlock relay winding 40 in parallel with the temperature sensing branch circuit. The relay winding 40 controls the contacts 18 in series with the damper motor 15 for selectively positioning of the damper 4 from its normally closed position. The relay winding 40 also controls a set of contacts 41 connected in parallel with contacts 24 and is thereby operable to provide an alternate circuit path providing power to the heater 5 and blower 6 circuits in response to closing the switch 22 to establish a conjoint control as more fully discussed hereinafter.

If the humidistat switch 22 of the humidistat 3 closes, power is thus supplied to the blower relay winding 25 and to circuit 27 as just described for the circuit response to thermostat 1 to provide corresponding system operation. However, in this condition the damper 4 is open as a result of the relay winding 40 closing contacts 18 to operate motor 15. The blower 6 operates therefore and draws air from the exterior of the building, heats it and supplies it to the building 2. The gravity operated damper 7 closes the recirculation path from the barn 2 to remove the recirculation of the existing air, as well as minimization of the migration of moisture laden air during a system standby condition. The hi-fire control contacts 24a remain open, thereby preventing firing of the hi-fire solenoid 26. The heater 5 then operates at a lower level. The heater 5 therefore heats the outside air until the air reaches the desired temperature level to hold the heater outlet temperature constant during such ventilation cycle regardless of the outdoor temperature unless the outdoor temperature is within 20° of the outlet temperature setting of the heater.

If, during the ventilating cycle, the thermostat 1 should call for further heat and closes switch 21 the associated contacts 24 and 24a of relay winding 23 both close, thereby establishing and providing the power to the hi-fire gas solenoid 26 resultig in heater cycling to maximum fire.

When the temperature and the humidity are at a proper condition, switch 21 of thermostat 1 and switch or contact 22 of thermostat 3 both open, thereby resetting of the firing circuit and opening of the several circuits to the heater 5, the damper 4 and the blower 6. Heater 5 and blower 6 are turned off while the damper 4 is moved to the closed position sealing of the damper and conditioning the system for recirculation of air within the barn in response to changes in the temperature condition. The system is then in a standby condition awaiting for a demand for heat or ventilation. In this system condition, the gravity dampers 6a and 7 are closed and minimize migration of moisture from the barn 1 back into heater 1.

In summary, closing of thermostat switch 21 results in the heating and circulating of the existing air in the barn.

Similarly, should the relative humidity rise above the preselected level, switch 22 will move to a closed position and results in the introduction, heating and circulation of outside air to the barn.

The heating and dehumidifying procedures discussed above can occur independent of each other or simultaneously.

Various modes of carrying out the invention are contemplated as being within the scope of the following claims particularly pointing out and distinctly claiming the subject matter which is regarded as the invention.

I claim:

1. A climate control to regulate the temperature and humidity of the air in a barn comprising:
    (a) temperature sensing means for detecting the temperature of the air in said barn and for comparing it to a preselected temperature;
    (b) relative humidity sensing means connected with said temperature sensing means for detecting the relative humidity of the air in said barn and for comparing it to a preselected relative humidity;
    (c) air circulating means operable by at least one of said temperature sensing means and said relative humidity sensing means for circulating the air in said barn;
    (d) heating means operable by at least one of said temperature sensing means and said relative humidity sensing means for heating the air circulated by said circulating means;
    (e) ventilating means operable by said relative humidity sensing means and connected to said heating means for introducing outside hot air into said barn;
    (f) and a minimum temperature sensing means for detecting the entrance of cold air into said barn and for discontinuing the operation of said air circulating means upon detection of said cold air.

2. A climate control to regulate the temperature and humidity of the air in a barn comprising:
    (a) temperature sensing means for detecting the temperature of the air in said barn and for comparing it to a preselected temperature;
    (b) relative humidity sensing means connected with said temperature sensing means for detecting the relative humidity of the air in said barn and for comparing it to a preselected relative humidity;
    (c) air circulating means operable by at least one of said temperature sensing means and said relative humidity sensing means for circulating the air in said barn;
    (d) heating means operable by at least one of said temperature sensing means and said relative humidity sensing means for heating the air circulated by said circulating means;
    (e) ventilating means operable by said relative humidity sensing means and connected to said heating means for introducing outside hot air into said barn;
    (f) and an air flow sensing means for detecting the restriction of air flow through said heating means and for discontinuing the operation of said heating means upon detection of said restriction.

* * * * *